United States Patent [19]

Shuey

[11] 4,242,629
[45] Dec. 30, 1980

[54] DC SWITCHING VOLTAGE REGULATOR WITH EXTENDED INPUT VOLTAGE CAPABILITY

[75] Inventor: Kenneth C. Shuey, Cridersville, Ohio

[73] Assignee: Westinghouse Electric Corp., Pittsburgh, Pa.

[21] Appl. No.: 965,553

[22] Filed: Dec. 1, 1978

[51] Int. Cl.³ .............................................. G05F 1/56
[52] U.S. Cl. .................................. 323/17; 323/22 T; 323/DIG. 1
[58] Field of Search ................. 323/17, 22 T, DIG. 1; 363/49, 124

[56] References Cited

U.S. PATENT DOCUMENTS

| | | | |
|---|---|---|---|
| 3,670,233 | 6/1972 | Zellmer et al. | 323/DIG. 1 X |
| 3,742,338 | 6/1973 | Sugano et al. | 323/22 T |
| 3,803,517 | 4/1974 | Bellocchio | 323/DIG. 1 X |
| 4,005,353 | 1/1977 | Yokoyama | 323/22 T X |

*Primary Examiner*—J. D. Miller
*Assistant Examiner*—Peter S. Wong
*Attorney, Agent, or Firm*—G. H. Telfer

[57] ABSTRACT

A direct current, high voltage, switching voltage regulator for generating a low voltage, low current supply referenced to the positive side of the input voltage is provided while maintaining operation over an extended voltage input range with maximum efficiency, that is, low power loss and heat dissipation.

4 Claims, 4 Drawing Figures

DC SWITCHING VOLTAGE REGULATOR WITH EXTENDED INPUT VOLTAGE CAPABILITY

BACKGROUND OF THE INVENTION

This invention relates to electronic circuitry for voltage regulation and, more particularly, to switching voltage regulators responsive to varying direct current input voltages to provide a regulated output voltage with minimal power dissipation.

In certain direct current circuit applications, there is required a low level control voltage referenced to, or of the same polarity as, the positive source voltage. One such application is in static power switching apparatus. By referencing the control voltage to the positive side of the supply, current may be sensed by a shunt resistor in series with a main power switch between source and load in DC power controllers without large common mode voltage problems. Numerous series voltage regulators are known that can accomplish the basic required function, but they are characterized by relatively high power loss and heat dissipation whih makes them undesirable where such considerations are important. Additionally, applications of such circuits encounter overdrive requirements to permit operability over a wide range of input voltages such as at least an order of magnitude. For example, an application of interest is in power controllers where the input voltage may vary over a range of from about 20 to 300 volts DC and the known circuitry of the prior art is generally efficient in performance over such a wide range.

Switching voltage regulators are generally known circuits that maintain a regulated output voltage level by transistor means that switches at the high voltage levels and encounters high losses over an extended range of input voltage, as such circuits have been heretofore arranged.

SUMMARY OF THE INVENTION

In accordance with the present invention, there is provided a direct current, high voltage, switching voltage regulator for generating a low voltage, low current supply referenced to the positive side of the input voltage. This function is obtained while maintaining operation over an extended voltage input range with maximum efficiency, i.e., low power loss and heat dissipation.

The circuitry generally comprises first transistor means connected across the input terminals for initiating current flow through an energy storage inductance upon occurrence of an input voltage level of predetermined magnitude with the inductance being connected so the voltage being developed by its current is impressed upon the output terminals. One of the input terminals and one of the output terminals are at the same, (high, positive) potential, such as by direct connection therebetween. A second transistor means terminates conduction by the first transistor means when the output voltage is up to the desired regulated voltage level. The second transistor means is also responsive to reduced load current to permit reinitiation of conduction by the first transistor means. In addition, and particularly significant to the present invention, is employed of a third transistor means for acting as a current source that maintains the first and second transistor means in operation at low power dissipation over a wide range of input voltage of at least about one order of magnitude.

DESCRIPTION OF THE PREFERRED EMBODIMENTS

Figure 1:
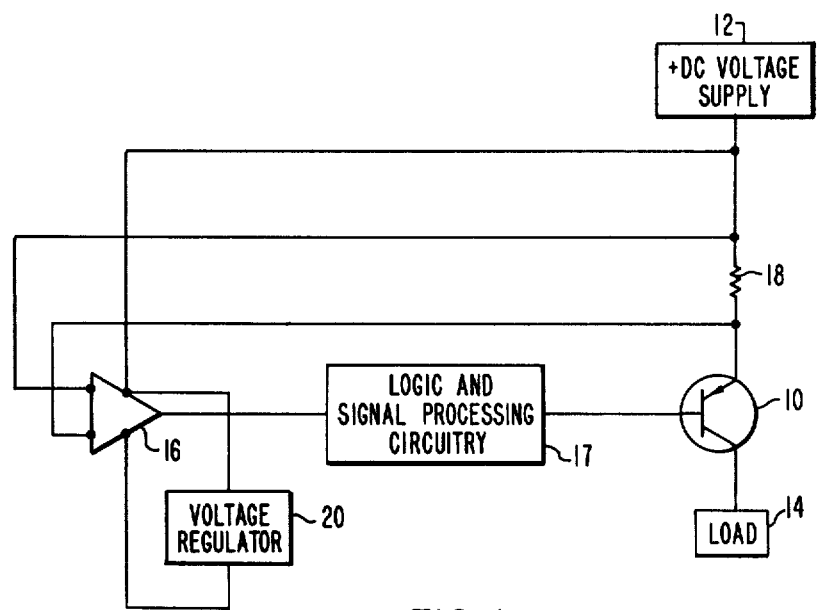
FIG. 1 is a generalized circuit schematic of an application of a voltage regulator that is desirably improved in accordance with the present invention.

Referring to FIG. 1, there is shown a transistor power switch 10 in circuit between a DC voltage supply 12 and a load 14 for controlling energization of the load. A current amplifying element 16 takes the signal of a current sensing element 18, which is a small value resistor in the power switch main circuit. From determining sensed current magnitude in relation to the input voltage, a logic and signal processing circuit 17 controls the application of the signal to the base of the power switch. A voltage regulator 20 is present to maintain the required level of working voltage for the current amplifier 16. This function is vital where the source voltage may vary and the requirements of the voltage regulator become particularly demanding as the source voltage may vary over a relatively wide range such as an order of magnitude or more.

Figure 2:
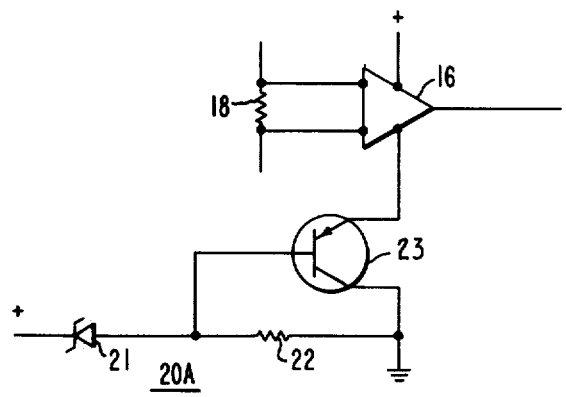
FIG. 2 is a circuit schematic of a prior art series voltage regulator as applied in the circuit of FIG. 1.

A series voltage regulator 20A generally in accordance with the prior art is depicted in FIG. 2, in association with amplifier 16. The high positive voltage is applied to a reverse biased zener diode 21 in series with resistor 22. Transistor 23 gets its base signal from the point between elements 21 and 22 and maintains the voltage at the lower voltage bias terminal of amplifier 16. Such a regulator draws considerable current over an extended voltage range.

Figure 3:
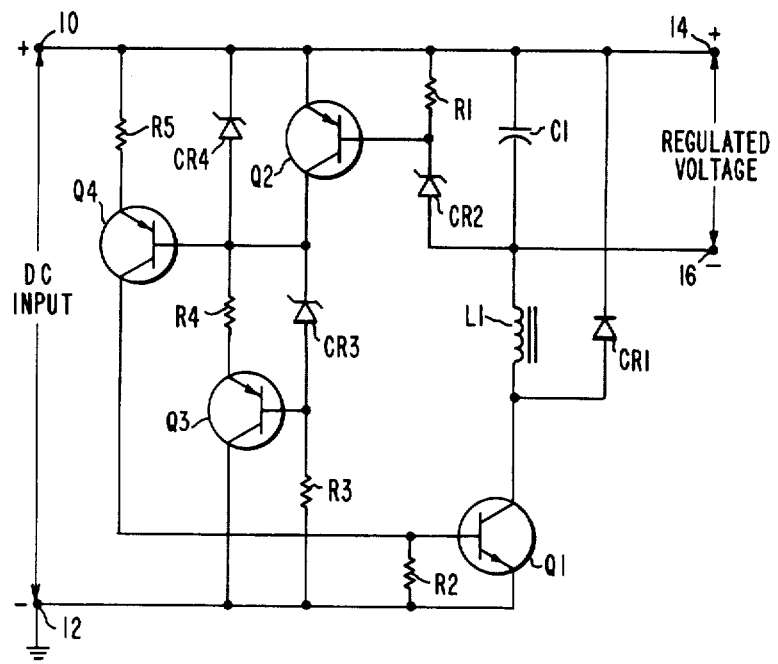
FIG. 3 is a circuit schematic in accordance with one embodiment of the present invention.

Referring to FIG. 3, an embodiment of the present invention is shown where an energy storage element, inductor L1, is utilized to achieve the regulated output in a closed loop switching regulator configuration. A first transistor means comprising transistors Q4 and Q1, connected as shown between input terminals 10 and 12, causes the inductor L1 to have current flowing through it upon the input voltage being brought up so that drive transistor Q4, operating in a current mode, is biased on. This can occur at a very low voltage, such as less than about 10 volts input. When the input voltage rises, such as above 20 volts, the current from the collector of Q4 biases transistor Q1 on and starts current flowing through inductor L1. The current through L1 creates a voltage across the load or output terminals 14 and 16 of which 14 is at the same high voltage as input terminal 10. When this voltage reaches the sum of the voltage drops of zener diode CR2 and the base-emitter voltage drop of a second transistor means, transistor Q2, base drive begins to transistor Q2 which clamps off the first transistor means comprising transistors Q4 and Q1 which are current coupled together.

The energy stored in inductor L1 is coupled to the output terminals through a commutation diode CR1 until the load voltage drops below the reference voltage drops provided by CR2 and the Q2 base-emitter voltage, at which time the regulation cycle is reinitiated. The total loop switching time is minimized by operating Q4 in the current mode so that it does not have to switch the high DC input voltage.

A third transistor means is provided in order to minimize the overdrive requirements of the initial drive transistor Q4. That is, base drive to Q4 is accomplished with a third transistor means operable as a current source and comprising transistor Q3 and its associated emitter and base resistors, R4 and R3, respectively, with zener diode CR3 connected across the bases of the two transistors Q3 and Q4. What the current source of the transistor arrangement of Q3 accomplishes is to maintain maximum efficiency even at high input voltage conditions while maintaining proper operation at low input voltages as well. The manner in which this is accomplished is by utilization of a low voltage value for CR3 which means the base drive current to Q4 is constant from a low value of input to rated DC voltage. The additional transistor gain stage of Q3 reduces the required current proportionally.

The circuit of FIG. 3 has been implemented with the following identified components, presented by way of further example, for operation in a circuit where the input voltage is expected to vary over the range of from about 20 to 300 volts DC and the regulated voltage level is about 15 volts.

| | | |
|---|---|---|
| C1 | - | 11μf |
| R1 | - | 51K ohms |
| R2 | - | 1K ohms |
| R3 | - | 1 meg ohms |
| R4 | - | 12K ohms |
| R5 | - | 1.5K ohms |
| CR1 | - | 1N649 |
| CR2 | - | 15v, 400 mω |
| CR3, 4 | - | 12v, 400 mω |
| Q1 | - | DTS 814 |
| Q2 | - | 2N2904A |
| Q3 | - | MPS A92 |
| Q4 | - | 2N6214 |
| L1 | - | 240 mh |

In FIG. 3, the portion of the circuit including elements C1, L1, CR1, Q1, and R2 are generally in accordance with prior art switching voltage regulators, where Q1 would have its base supplied directly from the high voltage input. The present invention retains the general operation of such elements but permits Q1 to work from the current source provided by Q4, CR4 and R5 which is further current sourced by the Q3 circuitry. As used herein, a transistor operated as a current source means the transistor is connected such that it has an emitter load, such as R5 for Q4 and R4 for Q3, and also that it has a base-emitter voltage clamp, such as CR4 for Q4 and CR3 for Q3.

In discussion of FIG. 3 it has been assumed the high voltage input terminal 10 is positive with respect to ground. It will be apparent that by use of complementary transistors in the circuit and reversal of polarity of the zener diodes that essentially the same circuit can be designed for use where a supply gives a negative voltage with respect to circuit ground.

Figure 4:
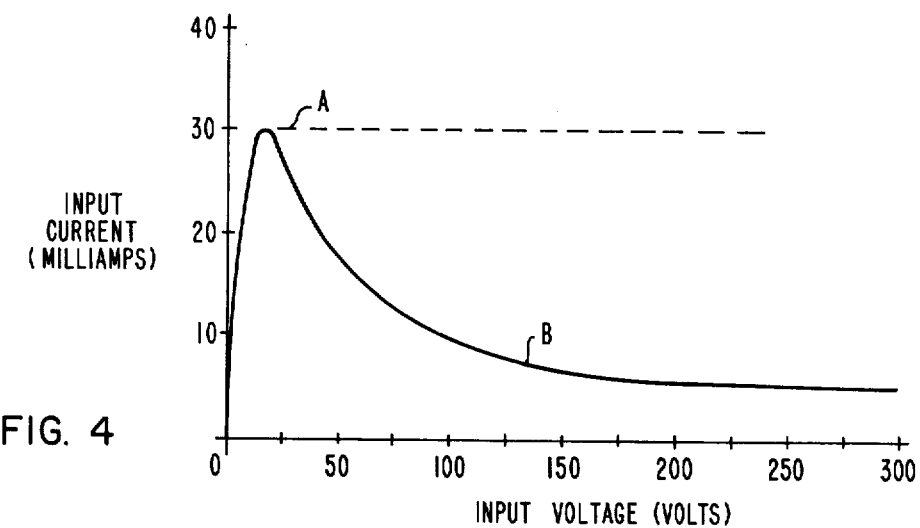
FIG. 4 is a plot of curves showing performance of circuits in accordance with the present invention as compared with those of the prior art.

Referring to FIG. 4, there is shown how the input current, that is the current through the voltage regulator circuitry, varies with input voltage for a fixed load. In curve A is shown the variation in this current over a wide range of voltage for a PNP series voltage regulator in accordance with the prior art (assuming negligible drive power), where it is shown that it draws a high current throughout the entire voltage range and thus suffers the consequences of high power loss and high heat dissipation. Howver, in the curve shown for the disclosed circuit of this invention, curve B, the input current is only at such a relatively high level at very low voltages and operates with reduced current at higher and higher voltages so that the overall efficiency is high and power loss and heat dissipation are minimized.

What is claimed is:

1. A direct current, high voltage, switching voltage regulator comprising: input terminals for receiving a DC voltage input that may vary over a range; output terminals for providing to a load a regulated DC voltage that remains substantially constant despite variation of said DC voltage input over said range; one of said output terminals being directly connected with the higher voltage one of said input terminals; first transistor means connected across said input terminals for initiating current flow through an energy storage inductor upon occurrence of an input voltage level of predetermined magnitude; said inductor being connected so voltage developed by its current is impressed upon said output terminals; second transistor means for terminating conduction of said first transistor means upon the voltage at said output terminals reaching a predetermined regulation voltage level; and third transistor means for acting as a current source that maintains said first transistor means in operation at low power dissipation over said input voltage range.

2. A switching voltage regulator in accordance with claim 1 wherein:

said first transistor means comprises first and second transistors of which said first transistor has its emitter resistively connected to a first input terminal, its collector connected to the base of said second transistor and its base connected to receive current from said third transistor means;

said second transistor means comprises a third transistor having its base electrode connected to a point between a resistor and a Zener diode and its emitter connected to said first input terminal so that the emitter-base voltage drop of said third transistor plus the voltage drop of said Zener diode, when less than the output voltage, cause conduction of said third transistor; and said third transistor means comprises a fourth transistor having its emitter and collector in circuit between the base of said first transistor and the second input terminal, and the base of said fourth transistor is connected in a branch across said input terminals with said third transistor emitter and collector in series therewith.

3. A switching voltage regulator in accordance with claim 1 wherein said input terminals are connected with a DC voltage supply that varies in magnitude over at least an order of magnitude.

4. A switching voltage regulator in accordance with claim 2 wherein: said first transistor of said first transistor means and said fourth transistor are each connected in a current source mode.

* * * * *